United States Patent [19]

Langlie et al.

[11] 4,040,604
[45] Aug. 9, 1977

[54] GATE HANDLE FOR AN ELECTRIC FENCE

[76] Inventors: Howard Langlie; Albert T. Berg, Jr., both of Ellendale, Minn. 56026

[21] Appl. No.: 672,800

[22] Filed: Apr. 1, 1976

[51] Int. Cl.² ............................................. A01K 3/00
[52] U.S. Cl. .................................. 256/10; 174/40 TD
[58] Field of Search ...................... 200/161; D26/10; 174/40 TD, 45 TD; 256/10, 39

[56] References Cited

U.S. PATENT DOCUMENTS

| 583,785 | 1/1897 | Brown | 256/39 |
| 2,306,661 | 12/1942 | Gengler | 256/10 |
| 3,684,248 | 8/1972 | Maes, Jr. | 256/10 |

FOREIGN PATENT DOCUMENTS

| 1,322,740 | 2/1963 | France | 174/45 TD |

Primary Examiner—Werner H. Schroeder
Assistant Examiner—Doris L. Troutman
Attorney, Agent, or Firm—Stuart R. Peterson

[57] ABSTRACT

A tubular plastic casing has a coil spring contained therein. A first rod member is hooked to the spring at one end of the casing, the rod member having a shank extending axially through the spring and outwardly through the opposite end of the casing. A hook is provided on the projecting end of this rod member for releasably engaging a post-mounted anchor. A second rod member, which is reversely bent, has its two adjacent ends hooked to the spring at the other end of the casing, the parallel shanks thereof extending through the spring and outwardly through the said one end of the casing so that the projecting reversely bent end can be attached to a length of electric fence wire. The tubular casing has a hand grip portion which is grasped when the gate is to be opened, the moving of the casing toward the gate anchor compressing the coil spring so that the hook on the first rod member can be readily disengaged from the anchor to permit passage through the gate.

6 Claims, 5 Drawing Figures

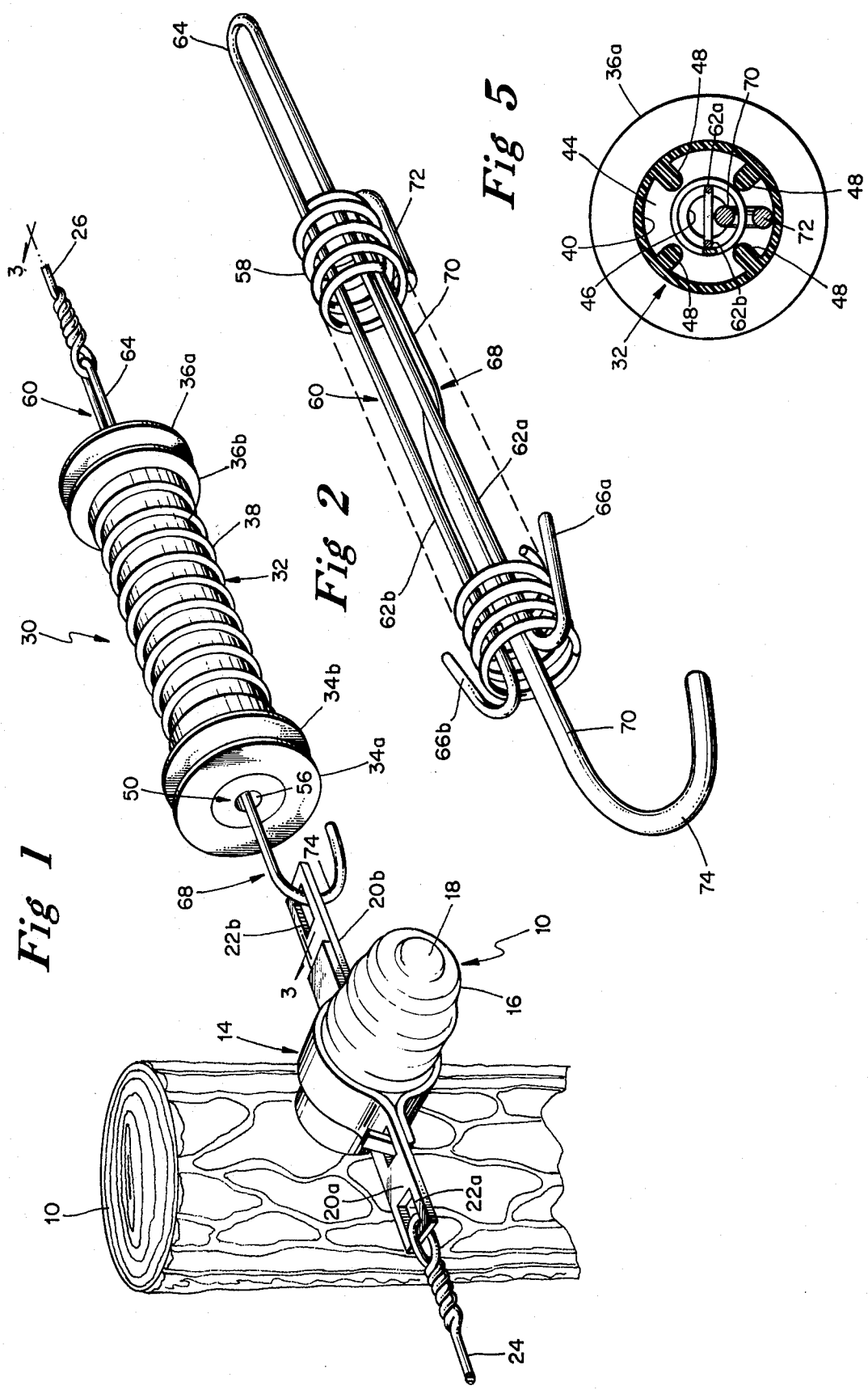

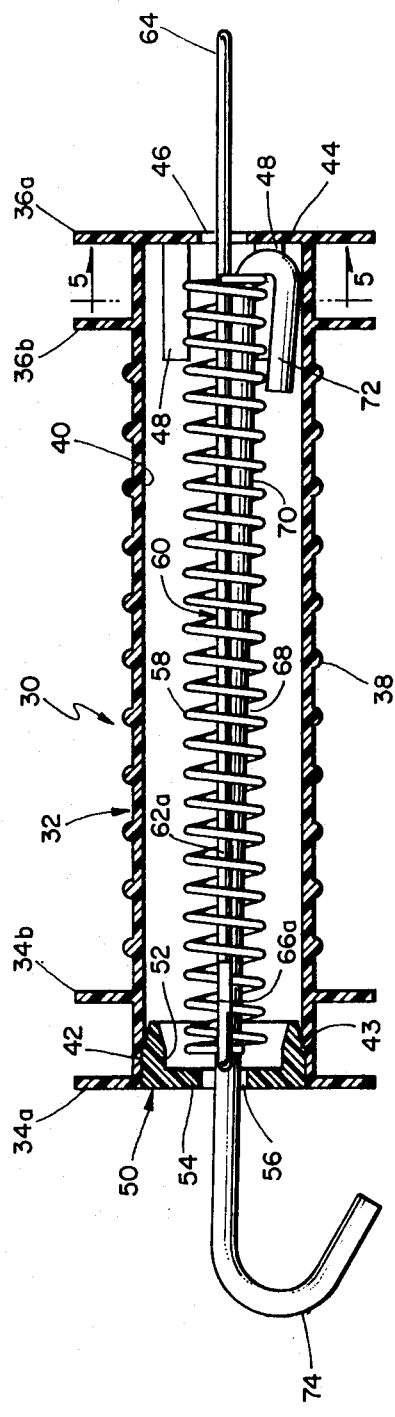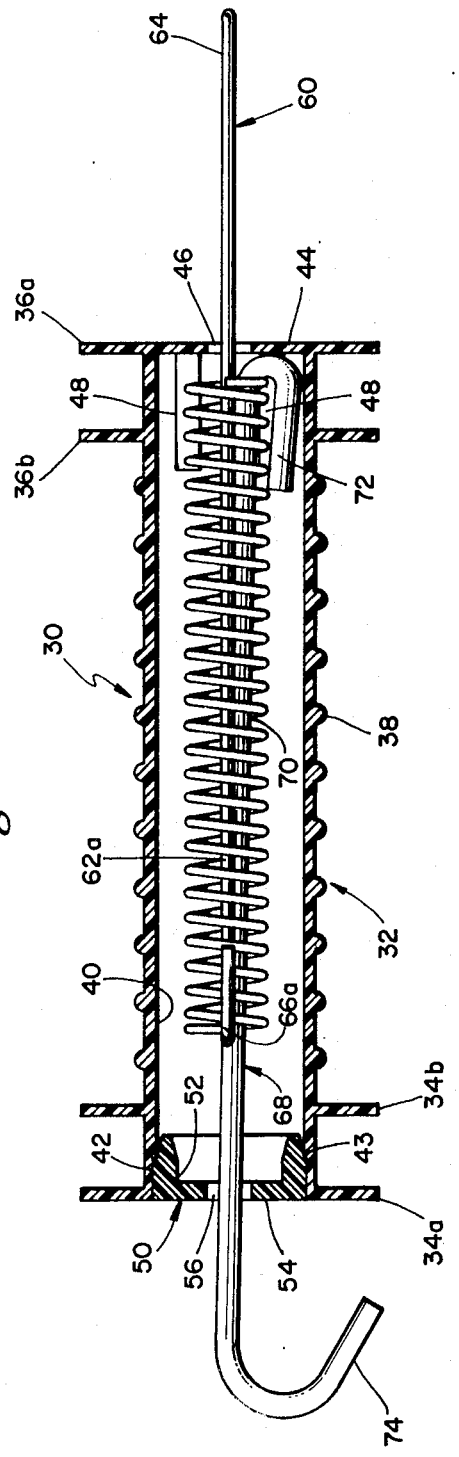

4,040,604

GATE HANDLE FOR AN ELECTRIC FENCE

BACKGROUND OF THE INVENTION

1. Field of the Invention

This invention relates generally to electric fences and pertains more particularly to a gate handle therefor.

2. Description of the Prior Art

Gate handles for electric fences, of course, are not new, having been used for years to permit passage from one side of an electric fence to the other without being subjected to shock from the high voltage pulses being applied to the electric fence. The gate handles with which we are acquainted utilize a relatively heavy coil spring disposed in a plastic casing. The coil is normally under tension, the tension being increased whenever the gate is to be opened. Also, the prior art handles, because of the way the coil spring is mounted, impose a strain on the casing. While originally casings were made of wood, the advent of suitable plastics has led to a changeover in materials. Nonetheless, to have the plastic casing itself shoulder any strain requires material for reinforcing purposes making the handle bulkier for a given dielectric or insulating effect. Still further, the casings with which we are familiar had to be molded in two parts, and then glued longitudinally during assembly. Because of such design, particularly the strain on the casing, the plastic had to be quite rigid, being moe vulnerable to breakage than if somewhat resilient. Also, breakage of the outside hook, which engages the post-mounted anchor, has been a shortcoming. Because of the glued construction, which as a practical matter thwarted disassembly, compelled the discarding of the entire gate handle.

SUMMARY OF THE INVENTION

Accordingly, one important object of the present invention is to obviate the need for a coil spring that is placed in tension during its use and to avoid having the casing in which the spring is housed subjected to objectionable strain. More specifically, an aim is to utilize a relatively lightweight compression spring contained within the bore of a lightweight plastic casing, such as medium density polyethylene, with no appreciable strain being placed on the casing itself. Actually, only a slight strain is ever imposed on the casing, which occurs only during the actual hooking and unhooking of the gate handle. Stated somewhat differently, the invention provides a plastic casing that normally "floats" with respect to the metal parts associated therewith.

Another important object is to provide a casing that can be molded in one piece, thereby avoiding any gluing. Consequently, a goal of the invention is to simplify the fabrication of a gate handle and at the same ime reduce its cost of manufacture.

Still further, an object of the present invention is to provide a hook at one end which is engageable with a fence post anchor which will not break, even when subjected to severe loads, and if it should become bent or distorted by having been subjected to too much strain, it can be readily restored to its original configuration.

Yet another object of the invention is to provide a gate handle having a casing that does not have to be made of rigid plastic, which if thin and lightweight can be quite frangible and easily broken, it being within the purview of the present invention to utilize polyethylene of medium density which is somewhat resilient and not apt to break. It is, therefore, within the purview of the invention to provide virtually a break-proof handle, both as to the metal and plastic parts of which it is comprised.

Briefly, our invention comprises a tubular casing of dielectric material, such as medium density polyethylene, which contains a coil spring in its bore or passage. One rod member has a hook at one end engaged within the casing to one end of the coil spring and another hook at its other end, which is outside the casing, for detachable engagement with an electric post anchor to which one length of electric fence wire is attached. A second rod member is reversely bent so as to form an outside loop for attachment to a second length of fence wire, the second rod member having outwardly turned hook ends which engage the other end of the coil spring within the casing. When the gate utilizing our handle is to be opened, the user simply grasps the ribbed handle portion of the casing and urges the casing in the direction of the post anchor, a portion of the casing causing the internally disposed coil spring to readily compress to whatever extent is needed to effect the detachment of the hook on the projecting end of the first rod member. The foregoing procedure is merely repeated when closing the gate, a slight amount of coil compression then maintaining the gate closed.

BRIEF DESCRIPTION OF THE DRAWINGS

FIG. 1 is a fragmentary perspective view of a portion of a typical electric fence utilizing our gate handle;

FIG. 2 is a perspective view corresponding to FIG. 1 but without the electric fence and with the casing removed from our gate handle;

FIG. 3 is a sectional view taken in the direction of line 2—2 of FIG. 1, the view depicting the slight degree of coil compression that exists when the gate using our handle is closed;

FIG. 4 is a sectional view corresponding to FIG. 3 but depicting the coil compressed to a greater degree so as to open the gate, and FIG. 5 is a sectional view taken in the direction of line 5—5 of FIG. 3.

DESCRIPTION OF THE PREFERRED EMBODIMENT

Referring now to FIG. 1, it will be observed that a portion of a conventional electric fence has been denoted generally by the reference 10. While electric fences make use of various types of posts, a wood post 12 has been shown as part of the fence 10. A conventional gate anchor labeled 14 is attached to the post 12. More specifically, the anchor 14 includes a dielectric insulator 16, such as of high density polyethylene, held to the post 12 by a nail 18. The anchor 14 further includes a pair of conventional interlocking clamp elements 20a and 20b, the element 20a having a hole 22a therein and the element 20b a similar hole 22b therein.

The electric fence 10 includes a first stretch or length of wire 24 that is attached to the clamp 20a, the wire 24 simply being threaded through the hole 22a and wrapped upon itself to effect the attachment. It will be appreciated that the length of wire 24 extends to the next post (not shown) spaced to the left at the post 12 and is held at the proper elevation thereon by a conventional electric fence insulator. A second stretch or length of fence wire 26 extends to the right and is mounted on the next post (not shown) spaced to the right of the post 12.

Since, to be effective, the electric fence 10 must provide an uninterrupted electrically conductive path between the wires 24 and 26, yet permit the controlled passage of people, vehicles and animals through the fence, the need for a gate handle is believed readily apparent. As already indicated, gate handles have been used for a relatively long time. Our improved gate handle, however, has been denoted in its entirety by the reference numeral 30. The handle 30 comprises a tubular casing 32 of plastic material, such as medium density polyethylene. As the description progresses, it will be seen that the casing 32 can be molded in one piece. At each end of the casing 32 are guard flanges. The flanges at one end have been assigned the reference numerals 34a and 34b, whereas the corresponding flanges at the other end have been labeled 36a and 36b. Between the flanges 34b, 36b is a ribbed hand grip portion 38 via which the casing 32 can be grasped to open the gate, as will become clearer as the description progresses.

From FIG. 3 and 4, it will be perceived that a bore 40 extends virtually the entire length of the casing 32. There is slightly enlarged counterbore 42 at one end of the casing 32 forming a slight shoulder at 43. At the other end of the casing 32 is an inwardly directed flange 44 having a central hole 46 that is of somewhat smaller diameter than that of the bore 40. Four integral ribs 48, which are quadrantly located, extend longitudinally from the flange 44. Owing to the shape of the casing 32, it can be readily molded in one piece, as is believed obvious.

Within the counterbore 42 is a removable plug 50, also of medium density polyethylene, having a cylindrical or sleeve portion 52. The plug 50 is formed with an inwardly directed flange 54 having a hole 56 therein. It will be recognized that the plug 50 is simply pressed into the counterbore 42, the inner end of the sleeve portion 52 abutting the somewhat smaller shoulder of the bore 40 where it joins the counterbore 42. A slight annular bulge (not noticeable) assists in firmly retaining the plug 50 in place within the counterbore 42. Normally, the plug 50 will remain in its press fitted relationship with the counterbore 42, but it can be removed and replaced if circumstances so dictate.

Playing a important role in the practicing of our invention is a coil spring 58 that is contained within the bore 40. As will become manifest hereinafter, the coil spring 58 is never stretched in that no tension is placed thereon; instead, the spring 58 is compressed, thereby enabling the coil spring to be of lighter weight construction than if it were subjected to tensional forces. It should be noted that the coil spring 58 is in no way anchored to any portion of the tubular casing 32. The right end of the spring 58, as viewed in FIGS. 3 and 4, is received or "seated" within the four ribs 48, and is in this way held concentric with the hole 46; FIG. 5 is designed to show this feature more clearly.

At this time, attention is directed to a first elongated rod 60 that is reversely bent on itself to provide parallel straight shanks 62a, 62b which extend through the entire length of the coil spring 58. In this way, a reversely bent end or loop 64 is provided which projects outwardly through the centrally disposed hole 46 in the inwardly directed integral flange 44 of the casing 32. Each shank 62a, 62b has an outwardly bent hook 66a, 66b, respectively, these hooks 66a and 66b being engageable with the end of the coil spring 58 that is nearer the plug 50. Although the direction in which the section is taken in preparing FIGS. 3 and 4 is oriented at right angles to a view that would show the engagement, it will be appreciated that the ends of the hooks 66a, 66b bear against opposite sides of the bore 40 to help center this end of the spring 58 with respect to the hole 56 in the plug 50.

A second elongated rod member 68 has a generally straight shank 70, although it can be formed with slightly offset portions as shown, extending through the coil spring 58. In this instance, the rod member 68 has a hook 72 that engages the end of the coil spring nearer the integral flange 44 and an outwardly located hook 74 that is releasably engageable with the clamp 20b of the gate anchor 14. As can be discerned from FIG. 5, the hook 72 is received between the lower two ribs 48. Therefore, the hook 72 is restricted to only a limited angular movement, which, of course, in turn limits the outer hook 74 to a similar amount of angular movement because of the shank 70 extending therebetween. The ribs 48 center this end of the spring 58 with respect to the hole 46 in the flange 44.

When the gate is to be opened, such as to permit the passage of cattle from one side of the electric fence 10 to the other side, the farmer or rancher only has to grasp the ribbed portion 38, then advancing the tubular casing 32 toward the gate anchor 14. Whereas the tubular casing 32 has been "floating," the movement just alluded to causes the inwardly directed integral flange 44 to be moved against the hook 72 on the rod 68. Since the hook 74 is at the other end of the rod, the shifting or advancing simply causes the coil spring 58 to become more compressed to permit detachment of the hook 74 from the clamp 20b of the gate anchor 14.

During the opening of the fence, the hooks 66a, 66b act as guides within the bore 40 of the tubular casing 32. Also, they function to absorb the reaction of the coil spring 58 as it is being further compressed by the opening action. It will be appreciated that the loop 64, owing to the parallel shanks 62a and 62b extending between the loop 64 and the hooks 66a and 66b transfer the reaction from the coil spring compression to the length of wire 26.

It will be recognized that the coil spring 58 only need be additionally compressed to whatever degree is necessary to effect the release or disengagement of the hook 74 from the clamp 20b. It should be appreciated that the casing 32 is subjected to strain only during the opening and closing of the gate, more specificaly when the casing 32 is being moved toward the gate anchor 14. If the spacing between the clamp 20b and the attached end of the wire 26 is properly selected, the constant degree of compression of the spring 58 is quite minimal and therefore the additional compression of the spring 58 to effect an opening of the gate is readily achieved. It should be appreciated, though, that the coil spring 58 can be compressed quite a bit without damage, so when installing a gate of the type appearing in FIG. 1, the installer has considerable leeway as to the spacing between the anchor 14 and the fence wire 26. In other words, he does not have to accurately determine the spacing in order to make use of a gate handle 30 constructed in accordance with the teachings of our invention.

It will be appreciated that with a coil diameter of 9/16 inch for the spring 58, the ribs 48 would have a diametrical spacing only a trifle greater than 9/16 inch in order to receive the right end of the spring 58 therebetween. It might also be pointed out at this stage that the coil spring 58 can be of wire stock having a cross section diameter of 1/16 inch. The rod stock for the members 66 and 68 need not be heavy, and in actual practice a rod diameter of ⅛ inch has been found quite satisfactory. This diameter, even though mild steel is used, provides a rugged hook 74 that is not apt to unbend during normal usage. On the other hand, should abnormal loads be imposed upon the hook 74, such as by inadvertently running a truck against the gate when it is closed, the hook 74 simply unbends but can easily be rebent into its hook-like configuration. One nicety about the invention is that the other parts constituting our gate handle 30 are not adversely affected. Thus, our gate handle is quite rugged and long-lasting in that it is not vulnerable to breakage as those used in the past.

We claim:

1. A gate handle for electric fences comprising a tubular casing having first and second ends, a compression coil spring contained in said casing having first and second ends, said first spring end residing nearer said first casing end and said second spring end residing nearer said second casing end, a first rod member having a hook at one end engaging said first spring end and having its other end projecting from said second casing end for attachment to one portion of an electric fence, said first rod member having a longitudinal shank extending freely from its hook end through said coil spring and freely through said second casing end to its projecting end, whereby said second casing end is readily movable relative to said first rod member, and a second rod member having a hook at one end engaging said second spring end and having its other end projecting from said first casing end for attachment to another portion of the electric fence, said second rod member having a longitudinal shank extending freely from its hook end through said coil spring and freely through said first casing end to its said projecting end, whereby said first casing end is readily movable relative to said second rod member, said tubular casing having an inwardly projecting portion at its said first end engageable with the hook end of sid first rod member when said casing is moved in the direction of the projecting end of said first rod member to cause said first spring end to move toward said projecting end of said first rod member, movement of said second spring end being resisted by the hook end on said second rod member, whereby said coil spring is compressed.

2. A gate handle in accordance with claim 1 in which said inwardly projecting casing portion constitutes a flange forming a hole through which the longitudinal shank of said second rod member freely passes by reason of said hole being larger than the cross section of said shank.

3. A gate handle in accordance with claim 2 in which said second rod member is reversely bent to form a second shank extending parallel to the first mentioned shank of said second rod member and a loop projecting from said first casing end for attachment to said another portion of the electric fence, the first mentioned hook at said one end of said second rod member being at the end of said first shank remote from said loop and said second shank also having a hook remote from said loop, said hole being sufficiently large so that both shanks of said second rod member freely pass therethrough, the shank of said first rod member extending between both hooks of said second rod member and having a hook at its projecting end for attachment to said one portion of the electric fence.

4. A gate handle in accordance with claim 3 including a removable plug member having a hole through which the shank of said first rod member freely passes by reason of said hole in said plug member being larger than the cross section of the shank of said first rod member.

5. A gate handle in accordance with claim 3 including quadrantly spaced ribs extending longitudinally from said inwardly directed flange for receiving said first spring end therebetween to orient said first spring end with respect to the hole in said flange.

6. A gate handle in accordance with claim 4 including quadrantly spaced ribs extending longitudinally from said inwardly directed flange for receiving said first spring end therebetween to orient said first spring end with respect to the hole in said flange and in which said tubular casing is of one-piece construction and said tubular casing and plug member are of medium density polyethylene, said plug member being pressed into the second end of said tubulr casing through which the longitudinal shank of said first rod member extends, the longitudinal shank of said first rod member passing through the hole in said plug member and in which both the hooks on said second rod member bear against the bore of said casing to orient said second spring end with respect to the hole in said plug.

* * * * *